Feb. 2, 1943.                M. B. REACH                2,309,865
                      METHOD OF MOLDING ARTICLES
                       Filed Sept. 13, 1941        3 Sheets-Sheet 1
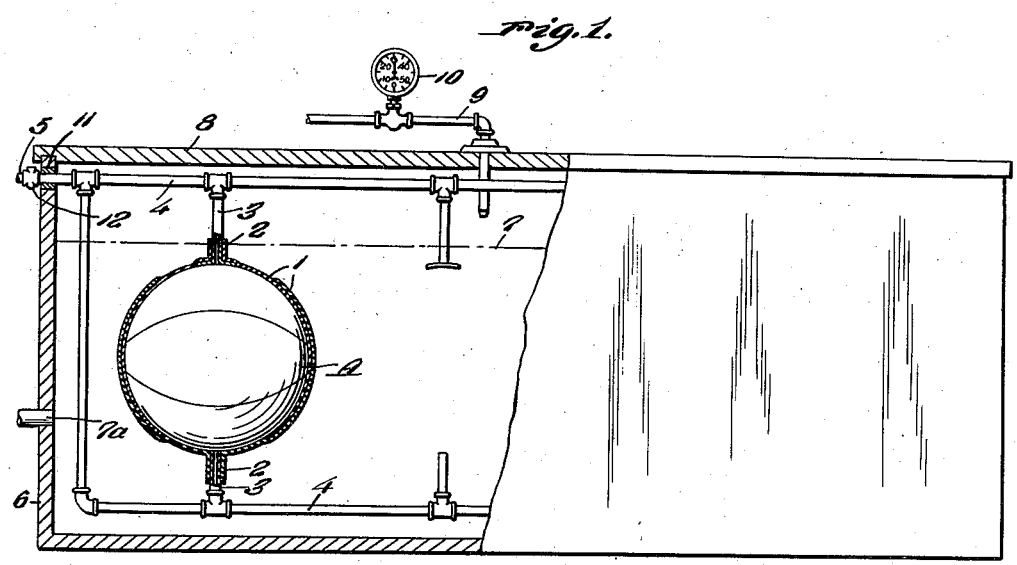
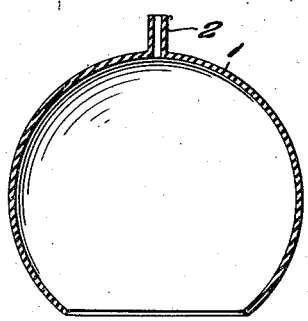
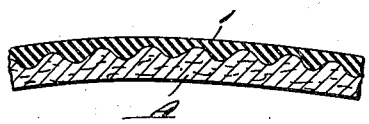
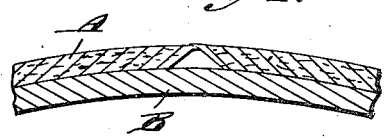
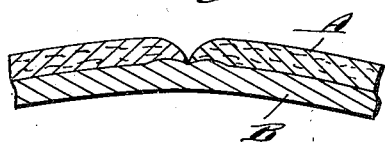
Inventor
Milton B. Reach
By Spear, Donaldson + Hall
Attorneys Feb. 2, 1943.  M. B. REACH  2,309,865
METHOD OF MOLDING ARTICLES
Filed Sept. 13, 1941  3 Sheets-Sheet 2
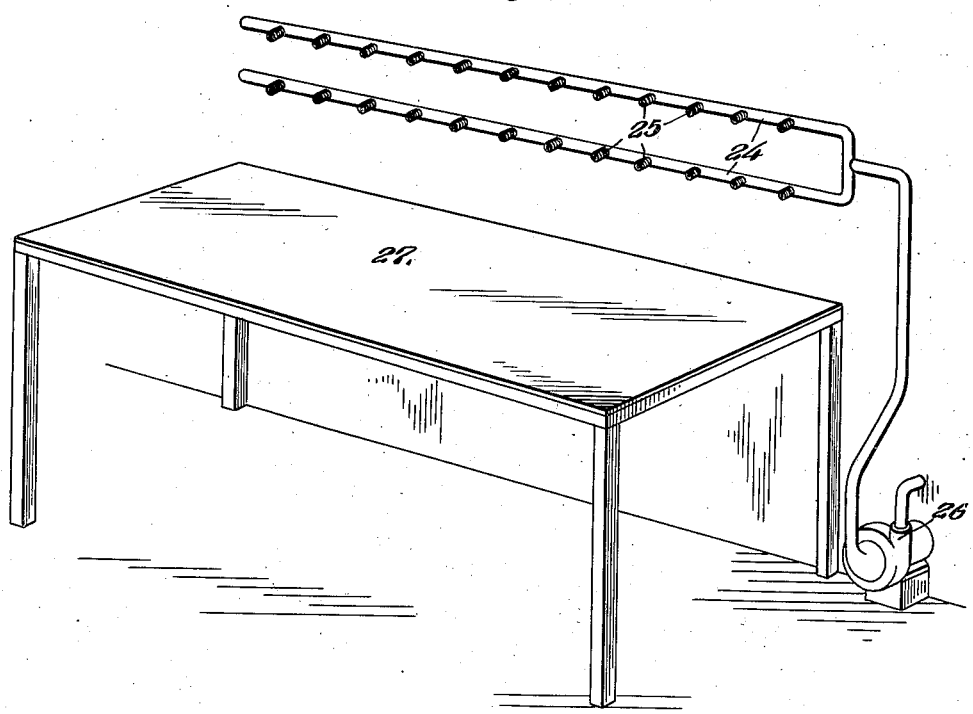
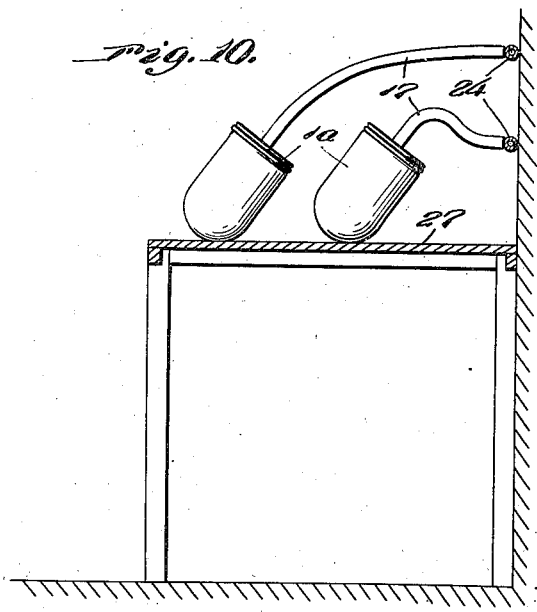
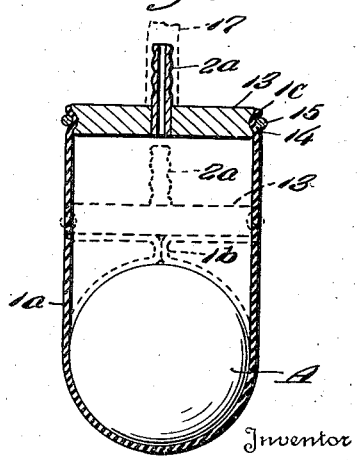
Inventor
Milton B. Reach
By Spear, Donaldson + Hall
Attorneys Feb. 2, 1943.  M. B. REACH  2,309,865
METHOD OF MOLDING ARTICLES
Filed Sept. 13, 1941  3 Sheets-Sheet 3
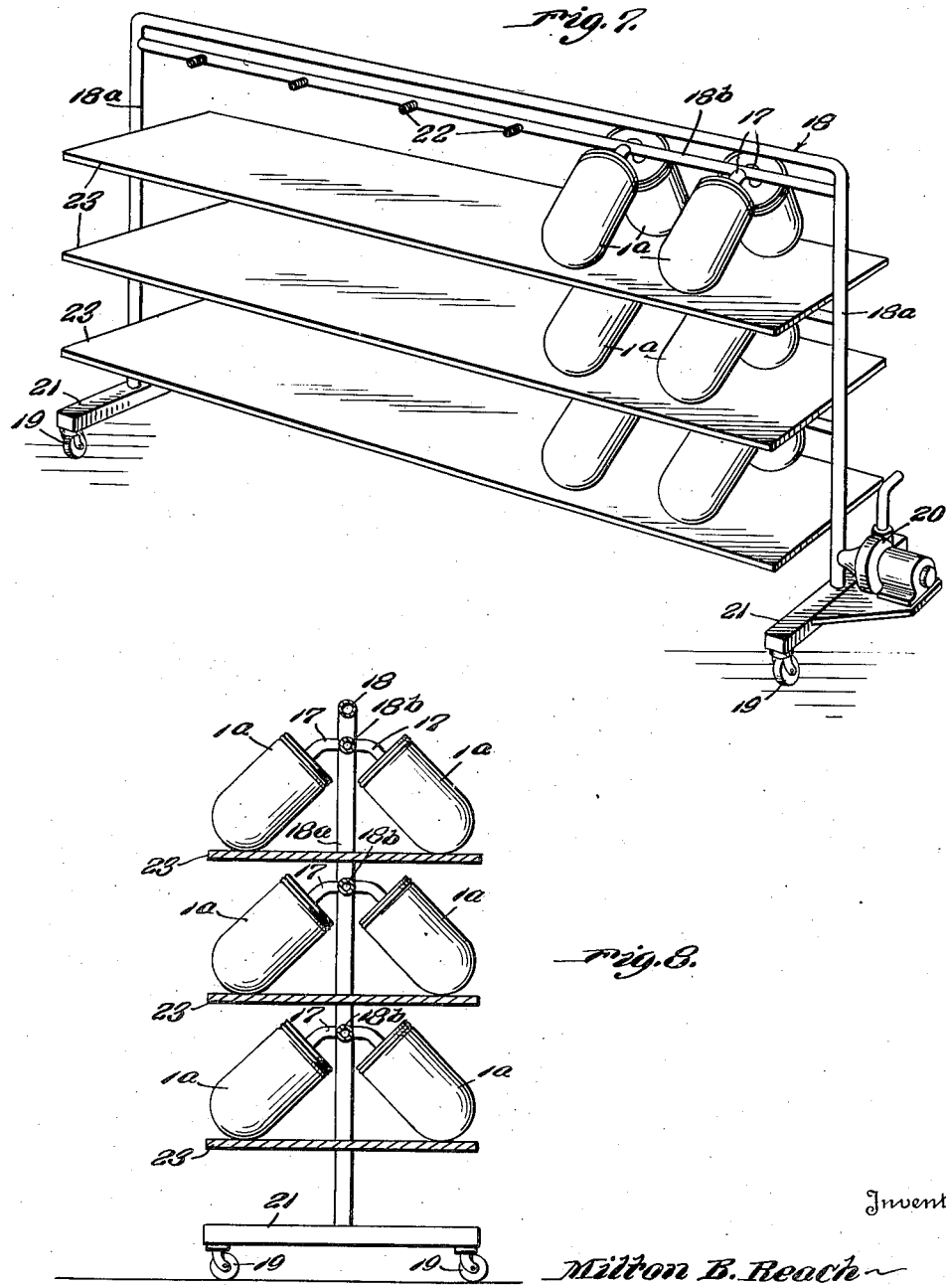
Inventor
Milton B. Reach
By Spear, Donaldson & Hall
Attorneys Patented Feb. 2, 1943

2,309,865

UNITED STATES PATENT OFFICE 2,309,865

METHOD OF MOLDING ARTICLES

Milton B. Reach, Springfield, Mass.

Application September 13, 1941, Serial No. 410,745

3 Claims. (Cl. 154—16)

The invention relates to method and apparatus for molding articles such as balls and has for an object the molding of the articles by method and means designed to mold the article under pressure while maintaining intact the irregularities and configuration of the surface of the article.

Another object is to provide method and apparatus designed for the simultaneous molding of a plurality of articles in any practical working quantity, with the further object of reducing the cost of the molding or vulcanizing operation. More particularly, an object of the invention is the provision of method and apparatus for molding and curing cemented cover sections of leather or other material onto the surface of a ball carcass or body.

It is another object of this invention to create a channel seam simultaneously with the vulcanizing of the cover and without added labor cost.

The invention consists in the features, combination, and arrangement of parts, and in the method, as hereinafter described and particularly pointed out in the claims.

In the drawings forming a part of the specification and illustrating how the invention may be carried out, Figure 1 is a view partially in section of an apparatus provided according to the invention.

Fig. 2 is a sectional view of one of the molded rubber sleeves or envelopes suitable for molding a ball.

Fig. 3 is an enlarged detail of a portion of the wall of an article provided with the envelope or cover in the molding process.

Fig. 4 is a view showing a section of ball carcass before molding, and

Fig. 5 is a view of the same after molding and providing a channeled or grooved seam construction.

Fig. 6 is a view of a preferred form of envelope.

Figs. 7 and 8 show diagrammatically a desirable form of portable rack for supporting the ball or other articles in the flexible envelopes, and for applying vacuum thereto.

Figs. 9 and 10 show diagrammatically another arrangement for supporting the ball and for applying vacuum to the flexible envelopes.

As now made inflated balls, with their leather covers applied to the carcass with a proper cement adhesion, are placed in metallic molds, preferably heated, and air is introduced into the interior of the ball by means of a needled valve to bring up the pressure sufficiently to cause the carcass to bear with its cover against the interior walls of the mold, producing the necessary pressure contact with its heated surface to iron the leather in place and vulcanize its adhesive element to the carcass. In the case of inflated balls, many of them have a pebbled surface, this pebbling being formed in the tannery. The pressure contact of this surface against the interior wall of the mold produces high spots of pressure on the pebbles, with the result that their original contours are more or less deformed and the pebbles are flattened out by the pressure. These pebbles play an important part in controlling the true aerial flight of the ball, and it is desirable to maintain their original conformation.

In certain types of balls the known method of molding does not give the proper vulcanizing pressure to those areas where the seams or joints occur. In the case of a skived edge assembly, that is, where the edges of the leather are skived on the underside and the points rolled down to create an inverted or channel seam, the mold normally does not contact this part of the ball. Separate filler pieces for molding can be laid in the channel seam of a thickness to bring their outer surface substantially level with the surface of the ball, or ribs may be provided in the mold to register with the seams, but these methods involve a careful placing of the filler strips or mold ribs, and any slippage in the molding operation produces a defective ball. The present invention is designed to overcome these difficulties.

Referring to the drawings, 1 represents an envelope or sleeve member desirably of thin rubber or the like and molded in a shape enabling it to be drawn over a ball or other article A to be molded. The sleeve or shell preferably covers the greater part of the surface of the ball or article and is molded with a small plug 2 providing an air vent or outlet therein.

Two of such envelopes or sleeves 1 may be employed as shown, one overlapping the other over a wide or large area, when applied to the ball or article to be molded. The air vent or outlet plugs or nipples 2 may extend in substantially opposite directions, and when the envelopes or sleeves have been assembled on the ball, as shown, their respective air vent plugs or nipples may be slipped over pipe stems 3 of a pipe frame or the like 4, so that the pipe stems 3 preferably substantially engage and lie flush against the surface of the ball or article to be molded. The pipe frame 4 is desirably vented to atmosphere as indicated at 5.

The pipe frame and balls or articles to be molded, thus assembled, may be placed within a tank or housing 6 and may be immersed in water of a suitable temperature for molding or vulcanizing. The water may be supplied through a suitable inlet, as indicated at 7a, and its temperature may be controlled in any suitable way, not shown, such as by pipe through which steam may be circulated under thermostatic control.

An air-tight lid 8 may be applied to the top of the tank or housing 6 and air pressure is introduced into the housing and on top of the water in an amount approximately equal to whatever air pressure may be used inside the carcass of the inflated ball or other article, during the molding operation, so as to maintain a balanced relationship and to avoid wrinkling of the cover which might take place were there substantially more air pressure on the outside of the ball than on the inside of the carcass so as to be greatly out of balance. However, if the outer pressure on the ball cover is only a few pounds greater than the internal pressure in the ball, a slight shrinkage in ball size may take place until pressures approximately balance, but this promotes tight seams and is not objectionable. The means for introducing the air pressure may desirably comprise a pipe line 9 which may be provided with a pressure gauge 10 and introduced at a suitable point into the tank as through the top thereof as shown.

The air vent pipe 5 leading to the outside air and atmospheric pressure is suitably tight fitting or sealed at the point where it goes through the wall of the tank by any suitable means 11, to prevent escape of the introduced air pressure around the vent pipe. Desirably the vent pipe 5 may be provided with a one way valve 12 in the end of the pipe to discharge the air which is trapped under the rubber sleeves or envelopes 1 and around the surface of the covered ball, and which is allowed to escape as the air pressure is applied.

As fluid pressure follows the line of least resistance, as pressure is applied to the flexible molding sleeves or envelopes, contact of the flexible molds is established throughout the entire surface of the ball cover A and the soft rubber sleeve, being impervious to the fluid pressure, is made to conform perfectly to all the irregularities of the surface of the ball cover, applying even pressure alike to high spots and low spots, and as indicated in Fig. 3 preserving the original character of the dimpled or pebbled surface of the ball cover.

Where the abutting edges of the leather cover of the ball are reduced, the even pressure on the flexible molding sleeves or envelopes, forces the reduced edges inwardly against the ball carcass B, thereby forming under pressure the grooved or channel seam or joint. Reference is made to my Patent No. 2,245,115, dated June 10, 1941, wherein the type of channel seam having reduced edges engaging the ball carcass, is disclosed and claimed, and also to my patent of Sept. 10, 1940, No. 2,214,179, wherein a method of forming this type of channel seam is disclosed and claimed.

Fig. 4 shows at A a leather cover having reduced edges as applied to the ball carcass B, before the vulcanization process of the present invention, and Fig. 5 shows the same section after vulcanizing by the present process.

The wide overlapping of the stretched rubber or flexible elastic envelopes produces a sealed union between the two rubber parts of the flexible mold which is sufficiently tight to prevent water being forced through between the two rubber parts. If desired, further protective means can be adopted by using a thin coat of rubber cement between the rubber envelopes which may be stripped or soaked off after each molding operation.

I may modify the above described method and means, by providing for the use of normal atmospheric pressure of 15 pounds per square inch to effect an adhesion of the cemented cover to the ball carcass.

In the use of the normal air pressure of 15 pounds on the exterior of the rubber envelope which encloses the covered ball, I render this pressure effective by applying suction or vacuum to exhaust all air content lying between the cover on the ball and the rubber or flexible envelope. As this air is evacuated, the rubber envelope is applied to the underlying contour of the covered ball under the full 15 pounds pressure, and the pressure and vacuum is maintained for whatever period of time is required to effect vulcanization of the cement used as an adhesive between the cover and the carcass.

Under this method, the balls in their rubber envelopes may desirably be assembled to a pipe line, connected with a vacuum pump (not shown) and when the air content between the covers of a group of balls and their envelopes, has been completely evacuated, that group of balls may preferably be stored in a drying or curing room of about 125° F. temperature to set off the curing properties in the rubber cement and accelerate its vulcanization.

The pipe line may, for example, be similar to that designated 4 in Fig. 1 except that the complete assembled rubber envelope of each ball preferably has only one outlet nipple such as 2, and consequently is connected to only one pipe nipple, such as 3. The vacuum may be applied at any suitable point in the pipe line, for example, at 5.

With only one nipple 2, required according to this method, in the use of two overlapping rubber envelopes for each ball, one of them would be without an outlet nipple 2 and would be closed at this point.

In this method employing vacuum, the liquid for applying heat, as described and shown in Fig. 1, may be dispensed with together with the tank therefor, as the vulcanizing temperature may be applied by heated air in the room, as above indicated, at atmospheric pressure.

Also in the process first described, the liquid can be dispensed with and the super-atmospheric air pressure within the sealed container 8 may be heated to the necessary temperature to effect vulcanization under the said air pressure. Or the heated liquid could be used in an open tank under the atmospheric pressure and vacuum method.

A preferred form of flexible envelope is shown in Fig. 6 in the form of a bag 1a of thin rubber desirably of approximately the same wall thickness as that of an inflating bladder for a ball or the like. The bag 1a is of sufficient size to receive the ball or other article with sufficient neck or excess 1b, when the ball or article is placed in the bag, to permit folding in of the neck of the bag around the ball under the fluid pressure, rather than stretching in. This feature of the invention eliminates stretching of the rubber envelope around the ball or article, which constant stretching wears out the rubber container more quickly than merely folding in or collapsing of the evacuated rubber envelope as provided by the present invention. The collapsed or folded in position of this form of rubber envelope is indicated in dotted lines in Fig. 6.

The open end 1c of the rubber bag or envelope may desirably be closed by receiving therein a closure top desirably in the form of a disc 13 of metal or composition preferably having a groove 14 in its edge against or in which the rubber at the mouth 1c of the bag is clamped by means of a band or clamp 15 of rubber or wire, and thereby sealed.

The closure member or disc 13 is provided with an opening 16 and a nipple 2a for connection by means of a rubber hose or the like 17 to the vacuum system, which may be of pipe, say ¼" in diameter.

As above stated, under the application of the fluid pressure and the evacuation of air from the bag 1a through the outlet nipple 2a in the sealing disc 13, the flexible bag 1a will collapse or fold in about the ball or other article, due to the adequate length of the rubber bag, without stretching of the rubber of the bag to any appreciable degree.

A desirable embodiment of the aforementioned modified method and means preferably employing normal atmospheric pressure and vacuum, may comprise movable racks 18 designed to hold a substantial number of balls or other articles, each rack being mounted on wheels 19, and carrying its own vacuum pump unit 20. An embodiment of such a rack is indicated in Figs. 7 and 8 and may be of any suitable dimensions or shape and capacity. A rack about six feet high and six feet long may be designed, for example, to hold four dozen balls, by arranging the balls in rows or tiers on opposite sides of the rack.

As shown, the rack may comprise a pipe frame or rack 18 suitably mounted on the cross members 21 carrying the wheels or rollers 19, one of which cross members also carries the vacuum pump unit which is in communication with the main pipe frame to apply vacuum to the balls. The pipe frame desirably may comprise upright pipe members 18a with a plurality of horizontal feed pipe members 18b connecting and communicating with said upright pipe members. The horizontal feed pipes 18b are provided with a plurality of nipples or stems 22 preferably on each side thereof for receiving the preferably rubber hose connections 17 of the rubber envelopes for the balls. The pipe frame may be, for example, of one inch pipe and the pipe outlets or stems may be of any suitable size, say ¼ inch. The pipe frame or rack also carries supports 23 for the rubber envelopes containing the balls. The pipe frame may be of pipe of say, one inch diameter.

Each rack desirably carrying its own vacuum pump unit, is loaded with rubber envelopes containing the balls or articles and when loaded, may desirably be wheeled into a common drying or curing room suitably heated, and the pumps connected to electric current to operate them, to apply the vacuum to the interior of the envelopes. By this plan any adjustment or repair of a unit is confined to that unit, thereby enabling the operation of other units to continue without interruption.

If is is not desired or not expedient to employ movable racks and separate loading and curing rooms, the method can be performed on stationary tables and on a stationary vacuum pipe frame or system in a room or housing which is suitably heated for effecting the drying and curing of the cemented covers on the balls or the molding or curing of other articles. Such an arrangement is diagrammatically represented in Figs. 9 and 10 in which a pipe or conduit system 24 of say, one quarter inch pipe is disposed on the wall of the drying or curing room. The pipe system is provided with outlet nipples 25 for receiving the rubber hose connections 17 to the rubber envelopes or bags 1a containing the balls or other articles, as before described, and the pipe system is connected to vacuum pump means 26.

Adjacent to the pipe system, there may be desirably disposed a table 27 for supporting the balls or other articles in the rubber envelopes as indicated in Figs. 9 and 10. The table may be of any suitable size, for as many balls as may be required for a working unit, and the balls may be arranged in rows or tiers in conformity with the rows or tiers of the pipe system, as indicated.

In each of the methods described, the principle of employing a molding surface conformable to the irregularities of the surface of the ball, under pressure, is employed.

While the invention is particularly adapted for vulcanizing leather or other covers on or to, specifically, inflatable balls, I do not wish to limit it to this particular article, the invention being applicable to other types of articles where like problems exist.

A further modification of the described methods, desirably employing vacuum, and particularly suited for applying covering material to playing balls, involves a moistening treatment of the covering material to facilitate its laying and then holding the covered ball under vacuum and pressure and moderate heat until the cover material has set and dried.

Certain types of leather are difficult to lay smoothly and this moistening and drying out treatment is particularly suited to the application of such covering material.

According to this method, the inner surface of the leather or other covering material is preferably treated with vulcanizable cement and the outer surface of the leather is desirably suspended over a steam bath to thoroughly soften it. The moist leather or other covering material is then applied to the ball or other article. The ball covered with the moistened leather covering is then enclosed in the soft rubber bag or envelope and the bag is attached to a vacuum pump as hereinbefore described and under moderate heat of the drying room, the cover is vulcanized or cured in place and the air content of the bag is drawn out and in the same operation the cover is dehydrated.

By ordinary methods of applying the leather cover, with certain types of leather, for example, horsehide, a fairly severe shrinkage takes place and causes trouble by creating open seams. Under the vacuum method, the moistened cover is held in place as originally laid and the seams are kept closed. The curing heat being relatively moderate and the treatment extending over several hours of constant pressure, the dehydration is effected slowly whilst the vulcanizing cement perfects its union between the body of the ball and the cover.

This moistening and curing method is applicable to any type of ball cover, particularly those employing types of leather, such as for example, horsehide, which is difficult to lay smoothly, and may be employed for inflatable or solid balls, and is well adapted for application of such covers to the solid playground type of base ball or so-called soft ball.

I claim:

1. Steps in a method to adhesively apply covering material to an inflated athletic or game ball by surrounding said ball in a flexible envelope, evacuating the air content between the envelope and the surface of the ball, and applying fluid pressure within the ball itself to sustain it against collapse during the period of adhesively securing the cover to the body of the ball.

2. Steps in a method of molding hollow articles comprising contacting the outside of the wall of the hollow article with a soft, flexible, yieldable means providing a molding surface for said article, and capable of conforming under pressure to the irregularities and configuration of said article, and applying fluid under pressure to force the soft yieldable means and article into engagement to mold the said article, said fluid under pressure being applied against the yieldable means by immersion in a body of liquid, and applying pressure to the surface of the liquid, the interior of the hollow article being supplied with fluid under pressure.

3. Steps in a method of molding hollow articles comprising contacting the outside of the wall of the hollow article with a soft, flexible, yieldable means providing a molding surface for said article, and capable of conforming under pressure to the irregularities and configuration of said article, and applying fluid under pressure to force the soft yieldable means and article into engagement to mold the said article, said fluid under pressure being applied to the exterior of the yieldable means, and fluid under pressure being applied to the interior of the hollow article.

MILTON B. REACH.